W. C. BARR.
Wheels and Axles for Wheelbarrows.

No. 151,073. Patented May 19, 1874.

Witnesses
John Becker
Fred. Haynes

William C. Barr
by his Attorneys
Brown & Allen

UNITED STATES PATENT OFFICE

WILLIAM C. BARR, OF JERSEY CITY, NEW JERSEY, ASSIGNOR TO THE TUBULAR BARROW AND TRUCK COMPANY OF NEW YORK.

IMPROVEMENT IN WHEELS AND AXLES FOR WHEELBARROWS.

Specification forming part of Letters Patent No. 151,073, dated May 19, 1874; application filed April 11, 1874.

*To all whom it may concern:*

Be it known that I, WILLIAM C. BARR, of Jersey City, in the county of Hudson and State of New Jersey, have invented a Combined Wheel and Axle for Barrows and other Vehicles, of which the following is a specification:

This invention consists in a combined wheel and axle, composed of a rim and two separate and distinct sets of arms or spokes, which are secured to the rim at intervening intervals, and are severally welded together at a suitable distance from the rim to form separate and distinct sections or extensions of axle on opposite sides of the wheel, such combined wheel and axle being simple, cheap, strong, and very firmly braced laterally; wherefore it is admirably adapted to barrows, although not by any means confined to these vehicles.

Figure 4:
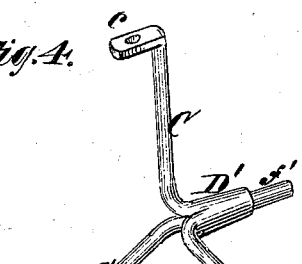
Figure 1:
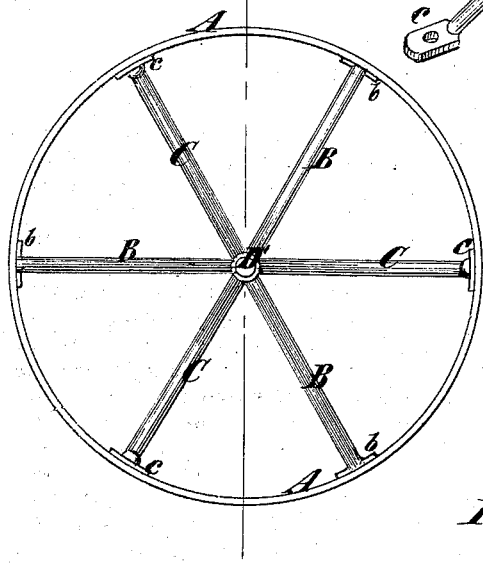
Figure 2:
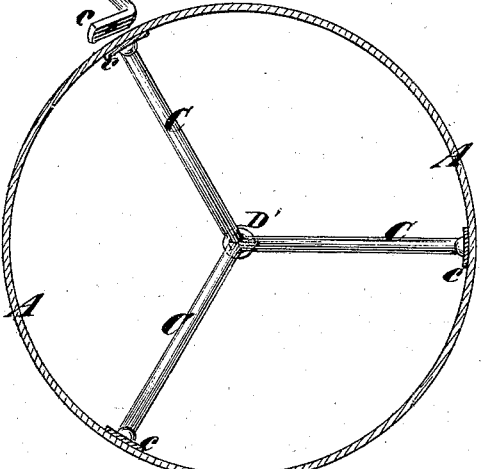
Figure 3:
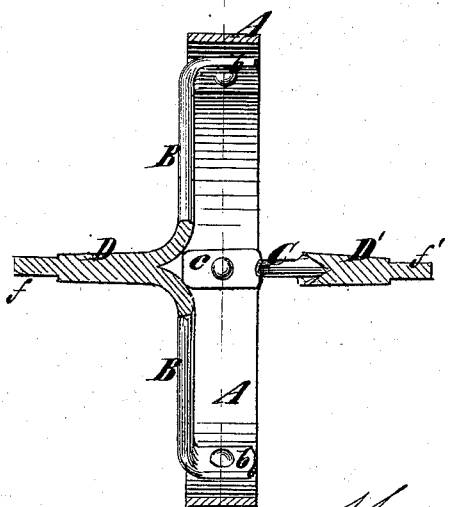

In the accompanying drawing, Figure 1 is a side view of my combined wheel and axle. Fig. 2 is a peripherical section of the same. Fig. 3 is a transverse or axial section thereof, and Fig. 4 is a perspective view of one of the sets of arms forming the spokes and axle.

A designates the rim of the wheel, such rim being preferably made of either cast or wrought iron. B and C indicate the two separate and distinct sets of arms or spokes, B indicating the one set, and C the other set. These arms or spokes are preferably made of wrought-iron, and the separate sets in this instance each number three. The outer ends, which are fastened to the rim A, are hammered out to form lugs $b\ c$, which are secured by riveting or other means to the said rim at regular intervening intervals, the arms of each set midway between the arms of the other set. They all extend radially toward the center of the rim's curvature, and at or near this point the several arms B B of one set branch off at right angles to the face or side of the rim, and are welded together, so as to form a section or extension, D, of an axle; and the several arms C C of the other set likewise branch off in the opposite direction, and are welded together to form the other extension or section D' of the axle, so that a complete although not continuous (see Fig. 3) axle is formed. Journals $f\ f'$ may be swaged, turned, or otherwise formed on the outer ends of the axle, as shown.

This combined wheel and axle is admirably adapted to barrows and other like vehicles and to other purposes. It is simple, cheap, strong, and exceedingly well braced laterally, because the separate sets of arms extend inward from opposite sides or edges of the rim A to the axle-sections C and C', which they form, (see Fig. 3,) and for this reason are wholly in separate planes; wherefore they brace each other perfectly, and form a much stronger wheel and axle than a wheel of the ordinary kind set on a continuous axle. This is manifestly of great advantage as regards barrow-wheels, for it affords ample provision for bracing the wheel laterally, as such wheels require, without needlessly adding to their bulk and weight.

I do not claim, broadly, a wheel having its rim or tire united to the hub or axle by means of spokes composed of straps or bars of iron.

What I claim as my invention, and desire to secure by Letters Patent, is—

The combination, with the rim A, of the two separate and distinct sets of arms B and C, the outer ends of the arms having lugs $b\ c$ bolted to the rim, and the inner ends being welded together to form the axle D D', all as shown and described.

WILLIAM C. BARR.

Witnesses:
VERNON H. HARRIS,
M. RYAN.